United States Patent Office 3,136,670

Patented June 9, 1964

3,136,670

POWDERLESS ETCHING

Marvin C. Rogers, Flossmoor, and Paul F. Borth, Park Forest, Ill., assignors to Photo-Engravers Research, Inc., Savannah, Ga., a corporation of Georgia No Drawing. Filed Sept. 14, 1961, Ser. No. 138,004

15 Claims. (Cl. 156—13)

This invention relates to the etching of photoengraving copper, more particularly, it relates to powderless etching and provides novel procedures and a novel composition for powderless etching.

Photoengraving copper printing plates, which can be copper or brass, are made by depositing a photosensitive film on the plate, impressing on the film the image to be printed by exposing the film to light passed through negative of the image, removing the unexposed film (which overlies the image area), and providing the remainder of the film (which serves to define the image area) in a hardened and acid resistant condition by chemically treating or by baking this portion of the film. The plate is then contacted with an etching solution, and the solution attacks the copper of the image area, but not the copper covered by the acid resistant coating, whereby the image is provided in relief on the plate.

From a consideration of the foregoing, it will be readily apparent that in order to accurately produce the image on the plate, it is necessary to control the extent to which the etching solution etches the sidewalls which form about the periphery of the image area as the etching progresses. With respect to etching of the sidewalls, this can be considered as involving two actions on the sidewalls One of these is the reduction of printing area due to sidewall etching and is referred to or measured as "etch factor," and the other is "undercutting action" which is the tendency for removal of metal from beneath edge portions of the acid resistant coating. Etch factor is the ratio of depth of etch remote from the sidewall to sidewall etch at the printing surface (i.e., the surface contacting the acid resistant coating). As to undercutting, speaking in reference to the etching of type characters, in the case of actual undercutting, the base of the characters would be narrower than the printing surface for the characters. Actual undercutting is undesirable; a right angle sidewall is suitable but in general is not a practical condition to maintain, rather, in general, some inward slope is tolerable, but the inward slope should not be excessive so as to significantly reduce the image area in relief.

In the past, a suitable etch factor has been provided and undercutting has been controlled by periodically interrupting the etching procedure and burning an acid resistant coating onto the sidewalls. Thus, at intervals during etching, the plates were removed from the etching bath, dried, treated to deposit powder on the sidewalls, and then fired to convert the powder to an acid resistant film. This manner of preventing undercutting has the obvious disadvantage of requiring frequent interruption of the etching procedure. To obviate this disadvantage, it has been proposed to utilize a procedure wherein an acid resistant film is formed on the sidewalls as etching progresses. Thus, the sidewall protective film is provided, so to speak, automatically as etching proceeds, and the periodic interruption of the etching is unnecessary. This new procedure is termed "powderless etching." It has been used successfully for the production of photoengraving copper printing plates.

The basic powderless etching process is described in Jones Patent 2,746,848. As is described in the Jones patent, thiourea is included in the etching bath and as etching proceeds a protective covering forms on the sidewalls of the image area. The same covering which forms on the sidewalls, of course, tends to form on other exposed copper surface, and, therefore, tends to form throughout the image area. To accommodate this condition, the etching procedure is modified so that any film formed on the image area is promptly removed. This is done by employing a splashing technique to contact the etching solution and the plate. The solution in splash form travels a course substantially perpendicular to the image area, and upon striking the image area, abrades away any film which has formed. The splash, of course, also strikes the sidewalls, but the angle in incidence with the sidewalls is such that the protective film on the sidewalls is not removed. Further, the etching solution also strikes the acid resistant coating which define the image area. This, however, is without significance since the acid resistant coating is not affected by impingement of the etching solution. An alternative to the splashing process, is to carry out the etching while the plates are immersed in the etching solution, and removing the film from the image area, but not from the sidewalls, by suitably brushing the image area.

It has now been found that improved results are obtained if copper thiourea chloride is added to the etching bath. Copper thiourea chloride can be made by reaction of thiourea and cupric chloride in an aqueous medium.

Preparation of copper thiourea chloride is described in the literature, J. Chem. Soc., London, Ray, 115:2. 873–7 (1919). This publication describes preparations from thiourea and cupric chloride. The preparation can be represented by the following formula:

$$H_2N\overset{\overset{S}{\|}}{C}NH_2 + CuCl_2 \longrightarrow H_2N\overset{\overset{H}{\overset{|}{N}}}{\underset{}{\overset{\|}{C}}}\text{—S—CuCl} + HCl$$

Copper thiourea chloride

The thiourea can be added to an aqueous solution of cupric chloride and the copper thiourea chloride can be precipitated, recovered by filtration, dried, and used as a powder in the procedure of the invention. It can be added to an etching bath as a powder or can first be dissolved and then added to the etching bath as a solution. Alternatively, and preferably since the copper thiourea chloride is difficult to work-up as a powder, the copper thiourea chloride can be stored as a slurry in its mother liquor, and this slurry can be added to the bath.

Instead of copper thiourea chloride, a substituted copper thiourea chloride can be used, provided it has a suitable solubility, for example at least 0.1 gram per liter, in the etching bath. By substituted copper thiourea chloride is meant copper thiourea chloride in which one or more of the hydrogen atoms are replaced by a substituent or substituents. As suitable substituents, there can be mentioned alkyl groups and aryl groups, for example methyl, ethyl, propyl, isopropyl, phenyl, and diphenyl. To prepare the substituted materials, the corresponding substituted thiourea can be used in place of thiourea.

The amount of copper thiourea chloride used can be 0.1–25, preferably 0.2–5, grams per liter of the bath. The solubility of the copper thiourea chloride is the only upper limit and as to the lower limit, it can be less than 0.1 gram per liter, but at least 0.1 gram per liter is usually required to obtain the desired effect. Where a substituted copper thiourea chloride is used, the amounts can be molar amounts corresponding to the amounts given for the unsubstituted material.

The improvement realized by using copper thiourea chloride is improved sidewall protection so that better etch factors are obtained. Better protection is obtained using copper thiourea chloride than is obtained using the same molar amount of thiourea, and further better protection is obtainable using copper thiourea chloride than can be obtained using thiourea.

Broadly considered then, according to the invention, in a powderless etching process, wherein the copper in the image area is contacted with an etching solution, and wherein a protective film forms about the periphery of the image area to protect the sidewalls and thereby provide a suitable etch factor and control undercutting, there is added to the etching solution copper thiourea chloride or substituted copper thiourea chloride.

As to the novel composition of the invention, the copper thiourea chloride can be used in admixture with other materials useful in providing a protective film in powderless etching. The novel composition of the invention is an admixture of formamidine disulfide or substituted formamidine disulfide, and copper thiourea chloride or substituted copper thiourea chloride.

Addition of formamidine disulfide to a photoengraving copper etching solution as a film-former to permit powderless etching is described and claimed in Daugherty and Vaughn application Serial No. 732,419, filed May 2, 1958, now U.S. Patent No. 3,033,725, and issued May 8, 1962. The formamidine disulfide can be used as a salt, e.g., formamidine disulfide hydrochloride. The manufacture of formamidine disulfide is described in an article by Werner in the Journal of the Chemical Society (London), vol. 101, pp. 2166–2180. Instead of formamidine disulfide, a substituted formamidine disulfide can be used. In substituted formamidine disulfides, one or more hydrogen atoms of the formamidine group are replaced by an alkyl group or aryl group such as the diphenyl group, the butyl group, the ethyl group, and the isopropyl group. As is the case for formamidine disulfide, the substituted formamidine disulfides can be used as their salts.

The components of the novel admixture of the invention improve each other in effectiveness. Thus, where copper thiourea chloride is used as the film-former for deep etching, i.e., etching to depths greater than 0.010–0.015 inch as is commonly practiced in line work, for copper concentrations in the etching bath in excess of 1.5–2 ounces per gallon, the etching tends toward being rough and irregular. The use of formamidine disulfide compensates for this deficiency in copper thiourea chloride so that roughness and irregularities do not occur to a significant extent for copper concentrations in the bath of up to about 4.5 ounces per gallon of bath. On the other hand, formamidine disulfide does not provide good sidewall protection for etching depths in excess of about 0.006–0.010 inch, but when used in combination with copper thiourea chloride, good protection is provided for greater depths and for deep etching as is described above. It will be seen, therefore, that by using the novel admixture of the invention, i.e., formamidine disulfide and copper thiourea chloride, the bath has a greater range of usefulness.

As to the proportion of copper thiourea chloride to formamidine disulfide (expressed as weight parts of copper thiourea chloride to formamidine disulfide dihydrochloride) this may be 0.15–4.00, will usually be 0.25–3 and is preferably 0.33–1. A proportion found to be particularly well suited is 0.5. While proportions outside of the broadest of these ranges can be used, this would be at the expense of not realizing the advantage of the combination to the extent usually desired. As to the amounts of each of the ingredients of the combination, reference is made to the foregoing disclosure of amounts of copper thiourea chloride to be used when copper thiourea chloride is used alone. As to formamidine disulfide, when this material is used alone, the amount can be about 0.6 gram to 3 grams of formamidine disulfide dihydrochloride per liter of bath. In the combination, the amounts of the ingredients will be within the ranges mentioned for the ingredients when they are used alone, and further regard to the proportions disclosed above and the consideration that when used in combination, less of each ingredient can be used than when the ingredients are used alone. The only upper limit on the amount of the film-formers is the amount which can be dissolved in the bath.

As to the form of the novel admixture of the invention, while this can be as a powder, as is pointed out above, it is preferred to use the copper thiourea chloride as a slurry, and the preferred form of the novel admixture is as a slurry of the two ingredients.

The etching bath is an aqueous ferric chloride etching solution as is known in the art for etching photoengraving copper. It can be about 26–46° Bé. and is preferably about 30° Bé.

*Example 1*

Etaching of copper plates was performed in 30° Bé. aqueous ferric chloride bath .0021 molar (0.16 grams per liter) in thiourea and in another 30° Bé. aqueous ferric chloride bath .0021 molar (0.365 gram per liter) in copper thiourea chloride.

Each copper plate used in the tests was photo-printed with an image, comprising 2–120 lines per inch halftoned gray scales. Thus, a resist coating was disposed so that the copper would be etched in a manner to leave a plurality of dots of varying diameter on the plate. Performance for the additives, thiourea and copper thiourea chloride was measured by observing the initial dot size of the smallest dot not to disappear. Thus, if the initial sizes for 4 dots was 10, 20, 30 and 40 microns, and in the test the $10\mu$ and $20\mu$ dots were etched away but the $30\mu$ and $40\mu$ dots were not, then a size of $30\mu$ would be used as a basis for expressing the performance of the additive.

Performance is expressed as the factor $100/D$, which is an index of the degree of sidewall protection afforded by the additive to the etching solution. D is the diameter before etching, measured in microns, of the smallest half-tone dot not removed ("etched away") during the etch. Hence, the larger the value of the factor $100/D$ the greater the protective effect.

The plates were etched face-down in a splash etching machine. Each specimen was etched for 2.5 minutes at a paddle speed of 550 r.p.m., with solution temperature constant at 80° F.

The results are set forth in the following table. The values of $100/D$ are given as a function of time, measuring the time from the addition of the thiourea and copper thiourea chloride to a fresh aqueous ferric chloride solution.

| Time (hours) | 100/D | |
|---|---|---|
| | Thiourea | Copper thiourea chloride |
| .25 | 1.65 | 1.5 |
| .50 | 1.7 | 1.8 |
| .75 | 1.7 | 1.9 |
| 1.00 | 1.7 | 1.9 |
| 1.25 | 1.75 | 1.75 |
| 1.5 | 1.7 | 2.0 |
| 1.75 | 1.7 | 1.9 |
| 2.0 | 1.7 | 1.9 |
| | | 2.0 |
| 2.25 | 1.85 | 2.05 |
| 2.50 | -------- | -------- |
| 2.75 | 1.75 | 2.05 |
| 3.0 | -------- | -------- |
| 3.25 | -------- | 2.0 |
| 3.5 | 1.75 | 1.7 |
| 3.75 | 1.6 | -------- |
| 4.0 | 1.6 | 1.65 |
| 4.5 | 1.65 | 1.8 |
| 4.75 | 1.65 | 1.8 |
| 5.00 | 1.6 | 1.6 |
| 5.50 | 1.5 | 1.5 |
| 6.00 | 1.45 | 1.45 |

It will be observed that between the interval of about ½ hour to 5 hours, higher values of $100/D$ (and therefore better sidewall protection) are obtained for the copper thiourea chloride.

*Examples 2–6*

To 30° Bé. etching baths, there is added copper thiourea chloride and formamidine disulfide dihydrochloride in the proportion set forth in the following table. Etching is carried out using these baths in the manner described in Example 1. The plates etched are photoprinted with a variety of images and performance of each bath is satisfactory until the copper concentration in the baths becomes 2 ounces per gallon. Thereafter, the baths are used for deep etching, in particular for etching type characters to 0.020 inch. The baths are used for deep etching until the copper concentration becomes 4.5 ounces per gallon. Performance of the baths for deep etching, for the copper concentration of 2–45 ounces per gallon, is evaluated by visually observing the etched surfaces for roughness and irregularity, and indicating the extent of roughness and irregularity by a value of (0) for acceptable surface texture (i.e., roughness and irregularity), (−) for unacceptable surface texture, and the extent to which the surface texture is better than the (0) value by (+)-(++++) accordingly as the texture improves from the (0) value.

| Example | Film-former, grams/liter | | Performance for deep etching |
|---|---|---|---|
| | Copper thiourea chloride | Formamidine disulfide dihydrochloride | |
| 2 | .8 | 0 | − |
| 3 | 1.2 | 0.4 | 0 |
| 4 | .8 | 0.4 | ++++ |
| 5 | .4 | .4 | ++ |
| 6 | 0 | 1.0 | Sidewall protection unsatisfactory. |

Where formamidine disulfide is used alone, at high copper concentrations for deep etching, sidewall protection is unsatisfactory, since printing area loss, and roughness and irregularity occur at the sidewall though not to an objectionable extent over the other image surfaces. The roughness and irregularity which is obviated according to the invention and which is reported in the table, is roughness and irregularity over the entire image area.

In Examples 2–6, as between various examples, the relative quantities of the film-former materials are not controlling or significant insofar as the results reported are concerned. Thus, to illustrate, as between Examples 2 and 3, the results would not be changed by using a higher copper thiourea chloride concentration in Example 2.

While the invention has been described with reference to particular embodiments thereof, modifications and variations will occur to those skilled in the art, and it is desired to secure by these Letters Patent all such modifications.

What is claimed is:

1. In a process of etching photoengraving copper to make therein an image in relief and including contacting the copper in the image area with an etching solution to make the image in relief therein and forming a protective film about the periphery of the image area to provide a suitable etch factor and control undercutting, the step which comprises adding to the etching solution 0.1 to 25 grams per liter of etching solution of a film-former selected from the group consisting of copper thiourea chloride and substituted copper thiourea chloride containing a substituent selected from the group consisting of alkyl and aryl groups, whereby to aid the forming of the protective film.

2. In a process of etching photoengraving copper to make therein an image in relief and including contacting the copper in the image area with an etching solution to make the image in relief therein, and forming a protective film about the periphery of the image area to provide a suitable etch factor, and control undercutting, the step which comprises adding to the etching solution 0.1 to 25 grams per liter of solution of copper thiourea chloride whereby to aid the forming of the protective film.

3. The process of claim 2, wherein the amount of copper thiourea chloride added to the etching solution is 0.2 to 5 grams per liter of solution.

4. In a process of etching photoengraving copper having a portion of its surface masked with a resistant coating to define an image area from which copper is to be dissolved, to make an image in relief therein, including contacting the masked and the unmasked portions with an aqueous ferric chloride etching solution to make the image in relief therein and forming a protective film about the periphery of the image area to provide a suitable etch factor and control undercutting, the step which comprises adding to the etching solution 0.1 to 25 grams per liter of solution of a film-former selected from the group consisting of copper thiourea chloride and substituted copper thiourea chloride containing a substituent selected from the group consisting of alkyl and aryl groups, whereby to aid the forming of the protective film.

5. In a process of etching photoengraving copper having a portion of its surface masked with a resistant coating to define an image area from which copper is to be dissolved to make an image in relief therein, including contacting the masked and the unmasked portions with an aqueous ferric chloride etching solution to make the image in relief therein and forming a protective film about the periphery of the image area to provide a suitable etch factor and control undercutting, the step which comprises including in the etching solution 0.1 to 25 grams per liter of solution of copper thiourea chloride whereby to aid the forming of the protective film.

6. The process of claim 5, wherein the amount of copper thiourea chloride added to the etching solution is 0.2 to 5 grams per liter of solution.

7. The method of claim 1, wherein a film-former selected from the group consisting of formamidine disulfide and substituted formamidine disulfide containing a substituent selected from the group consisting of alkyl and aryl groups is included in the etching solution, and the photoengraving copper is subjected to deep etching.

8. The method of claim 2, wherein formamidine disulfide is included in the etching solution, and the photoengraving copper is subjected to deep etching.

9. A composition for use in the powderless etching of photoengraving copper to provide a protective film about the periphery of the image area during the etching by contacting the copper with an etching bath, comprising per liter of etching bath an admixture of 0.6 to 3 grams of a film-former, selected from the group consisting of formamidine disulfide and substituted formamidine disulfide containing a substituent selected from the group consisting of alkyl and aryl groups, and 0.1 to 25 grams of a film-former selected from the group consisting of copper thiourea chloride and substituted copper thiourea chloride containing a substituent selected from the group consisting of alkyl and aryl groups.

10. A composition according to claim 9, said admixture being of formamidine disulfide and copper thiourea chloride.

11. A composition according to claim 10, the weight proportion of copper thiourea chloride to formamidine disulfide being about 0.15–4.

12. A composition according to claim 10, the weight proportion of copper thiourea chloride to formamidine disulfide being about .25–3.

13. In a process of etching photoengraving copper to make therein an image in relief and including contacting the copper in the image area with an etching solution to make the image in relief therein and forming a protective film about the periphery of the image area to provide a suitable etch factor and control undercutting, the improvement which comprises adding to the etching solution 0.1 to 25 grams of a member of the group consisting of copper thiourea chloride and substituted copper thiourea chloride containing substituents selected from the group consisting of alkyl and aryl groups, and 0.6 to 3 grams per liter of solution of a member of the group consisting of formamidine disulfide and substituted formamidine disulfide containing substituents selected from the group consisting of alkyl and aryl groups.

14. The process of claim 13 wherein a substituted copper thiourea chloride containing an ethyl group is employed.

15. The composition of claim 9 which contains 0.2 to 5 grams of copper thiourea chloride per liter of etching bath.

References Cited in the file of this patent

UNITED STATES PATENTS

| | | |
|---|---|---|
| 2,908,557 | Black et al. | Oct. 13, 1959 |
| 3,033,725 | Daugherty et al. | May 8, 1962 |
| 3,033,793 | Bradley et al. | May 8, 1962 |